United States Patent [19]

Flot et al.

[11] 4,435,454
[45] Mar. 6, 1984

[54] RECOVERABLE ARTICLE

[75] Inventors: Regis Flot, Eragny; Michel Zoppi, Creteil, both of France

[73] Assignee: Raychem Pontoise S. A., France

[21] Appl. No.: 364,267

[22] Filed: Apr. 1, 1982

[30] Foreign Application Priority Data

Apr. 8, 1981 [GB] United Kingdom ................ 8111059

[51] Int. Cl.³ .............................................. B32B 7/14
[52] U.S. Cl. ...................................... 428/36; 156/86; 174/DIG. 8; 29/859; 428/198
[58] Field of Search .................... 428/36, 198; 156/86, 156/152, 165, 344; 174/DIG. 8; 29/859

[56] References Cited

U.S. PATENT DOCUMENTS

| | | | |
|---|---|---|---|
| 2,027,961 | 1/1936 | Currie | 174/DIG. 8 |
| 3,243,211 | 3/1966 | Wetmore | 174/DIG. 8 |
| 3,312,772 | 4/1967 | Sherlock | 174/DIG. 8 |
| 4,298,641 | 11/1981 | Boettcher | 174/DIG. 8 |
| 4,342,800 | 8/1982 | Changani et al. | 428/36 |
| 4,376,798 | 3/1983 | Diaz | 29/859 |

FOREIGN PATENT DOCUMENTS

| | | |
|---|---|---|
| 2308488 | 11/1976 | France . |
| 2383781 | 10/1978 | France . |
| 50-23751 | 8/1975 | Japan ........................ 174/DIG. 8 |
| 990235 | 4/1965 | United Kingdom . |
| 1550816 | 8/1979 | United Kingdom . |
| 1557930 | 12/1979 | United Kingdom . |
| 2027561 | 2/1980 | United Kingdom . |

OTHER PUBLICATIONS

*Electronique Industrielle*, No. 99 (Dec. 1966), p. 813, "Un Simple Cable Detecteur D'Incendie".

*Primary Examiner*—William R. Dixon, Jr.
*Attorney, Agent, or Firm*—James W. Peterson

[57] ABSTRACT

A heat-recoverable article is formed from a tube of cross-linked polymeric material. Subsequent to cross-linking, spaced-apart portions of the article are welded together to form two separate compartments in the article. The cross-linking and welding are arranged so that the weld is broken by the forces generated on recovery of the article, whereby the two compartments merge into one. An insert of solder may be provided in one of the compartments, and the other compartment may receive two electrical conductors to be spliced together.

18 Claims, 8 Drawing Figures

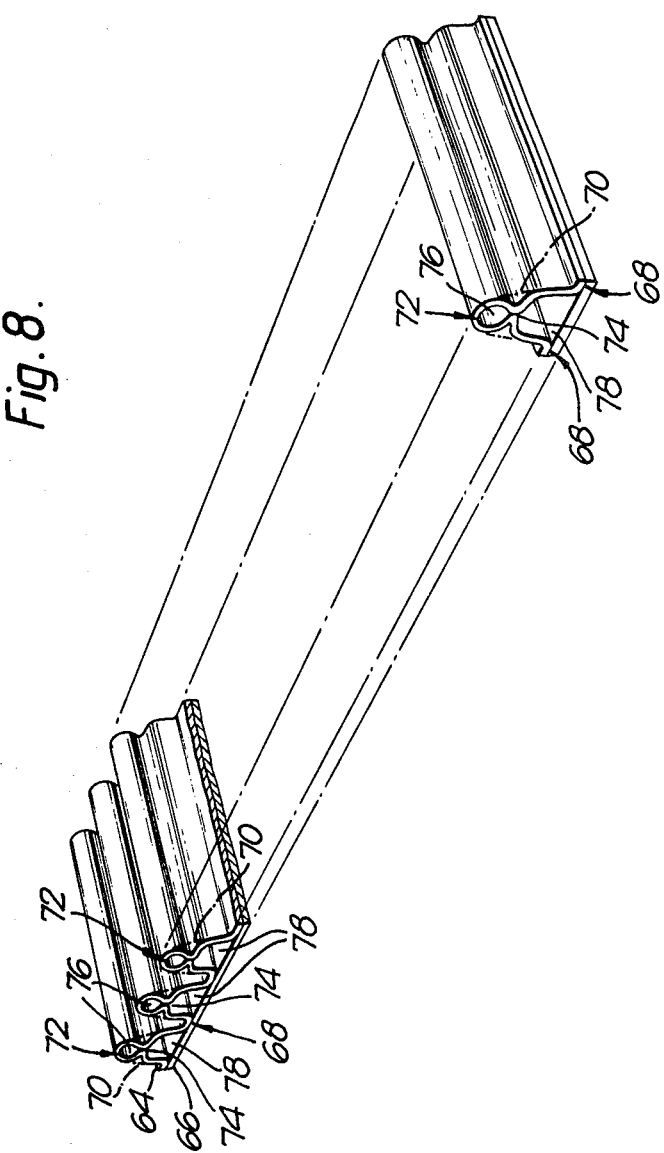

RECOVERABLE ARTICLE

DESCRIPTION

This invention relates to a recoverable article, particularly, though not exclusively, to a heat-recoverable tubular article used as an electrical connector, and to its method of manufacture.

By a "recoverable" article is meant an article that has a dimensional configuration which may be made substantially to change when subjected to the appropriate treatment. The article may be dimensionally heat-recoverable, the dimension configuration of which may be made substantially to change when subjected to heat treatment. Heat-recoverable articles may be produced by deforming a dimensionally heat stable configuration to a dimensionally heat unstable configuration, in which case the article will assume, or tend to assume, the original heat stable configuration on the application of heat alone. According to one method of producing a heat recoverable article, a polymeric material is first extruded or moulded into a desired shape. The polymeric material is then cross-linked or given the properties of a cross-linked material by exposure to high energy radiation for example a high energy electron beam or gamma radiation. The cross-linked polymeric material is heated and deformed, and then locked in the deformed condition by quenching or other suitable cooling means. The deformed material will retain its shape almost indefinitely until exposed to a temperature above its crystalline melting temperature, for example about 120° C. in the case of polyethylene. Examples of heat-recoverable articles may be found in U.S. Pat. No. 2,027,962 and in U.K. Pat. Specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, whilst hot, to a dimensionally heat unstable form.

Connectors of this general type are known, for example from U.S. Pat. Nos. 3,243,211 and 3,312,772, in which a heat recoverable polymeric sleeve containing a quantity of fusible material, for example solder, is recovered into sealing engagement around two or more electrically-conductive members. The provision of a pre-installed ground lead, retained against the inner surface of the sleeve by an insert, for making the electrical connection is also disclosed. Such connectors have found wide applicability.

It is one object of the present invention to provide a recoverable article that has advantages of manufacture and applicability over known articles.

It is another object of the invention to provide a recoverable, preferably heat-recoverable, article that is compartmentalised for ease of introduction therein of a substrate but which on recovery provides a single compartment closely configured to the substrate.

It is a further object of the invention to provide a recoverable article that is compartmentalised to receive respectively one or more fusible inserts and a substrate but which on recovery allows said inserts to contact said substrate.

In accordance with one aspect of the present invention, there is provided a recoverable article in which spaced-apart portions thereof are temporarily secured together, to form at least one compartment in the article, the article being arranged such that forces produced therein on recovery about a substrate overcome the forces securing said portions together.

As used herein, "compartment" is understood to include a configuration that has little or no third dimension, that is to say it is understood to include "aperture".

Such an article may thus initially have a first configuration, for ease of application, and may then be arranged to adopt a second configuration, on recovery, simply by breakage of the temporary securement between the spaced-apart portions thereof.

In a preferred embodiment, at least each of said spaced-apart portions, and conveniently the whole of the article, is formed from cross-linked polymeric material and the spaced-apart portions thereof are subsequently secured together by welding. Since welding cross-linked material does not generally produce a strong bond, the weld fails on recovery. To this end, parameters such as welding pressure, welding power, degree of cross-linking and thickness of the material from which the article is made, are selected so that the recovery forces exceed the welding forces when the article is recovered about a substrate. The welding may be effected by any suitable means, for example high-frequency, radio-frequency, or ultra-sonic welding apparatus.

The aperture may be provided, for example, at an end of the article and the compartment extend thereinto, or be provided partway along the article, when the article is of generally elongated configuration. When the article is used as an electrical connector, for example, the aperture or compartment may be arranged to receive one, or more, electrically-conductive members to be connected.

The article may provide a plurality of apertures or compartments that on recovery are arranged to merge into a single aperture or compartment.

The or each compartment may be tubular, and when a plurality of compartments are provided, each may have an axis of symmetry, and the axes may extend substantially parallel to each other.

The article is preferably recoverable by heat.

The article may include an insert, which may be fusible and, for example, comprise solder. In the latter case, and when the article is used as an electrical connector, the solder is preferably arranged to form an electrical connection within the article.

Another aspect of the invention provides an arrangement comprising two sheets of material, at least one of which is recoverable, overlying one another and permanently secured together at spaced apart locations so as to define therebetween a plurality of recoverable articles, each of which is in accordance with said one aspect of the invention.

It is to be understood that reference to the sheets being secured together "permanently" means that the bond therebetween is not broken on recovery of the articles, which recovery is effective to break the temporary securement between said spaced-apart portions of the articles.

Although the arrangement may comprise only two of the recoverable articles, in general it is envisaged that a larger number of articles will be provided by the two sheets.

Preferably both of said sheets are of cross-linked polymeric material, at least one of which is recoverable, for example by heat.

Also in accordance with the present invention, there is provided a method of manufacturing a recoverable article, wherein, in an unstable state of the article, spaced-apart portions thereof are secured together to form at least one aperture or compartment in the article in such a way that forces produced therein on subsequent recovery about a substrate are sufficient to overcome the forces securing said portions together.

It will be appeciated that the method of the invention may be applied to produce the articles discretely, or to form a plurality of them in an arrangement.

A recoverable article, and its method of manufacture, each in accordance with the present invention, will now be described, by way of example, with reference to the accompanying drawings, in which:

FIG. 8 is a perspective view showing part of an arrangement of articles provided by two sheets of material.

Figure 1:
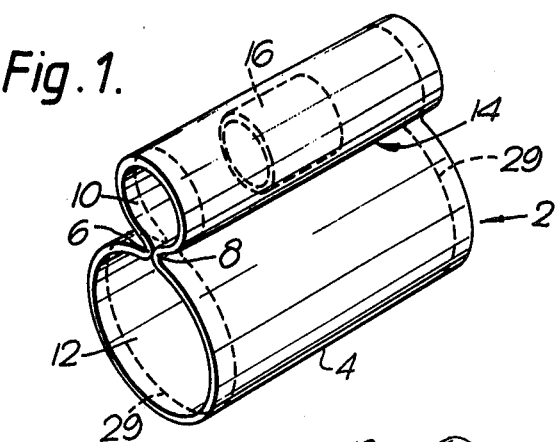
FIG. 1 is a perspective view of a first embodiment of the article.

Referring to FIG. 1, a recoverable article 2 is formed from a tubular sleeve 4 that originally was joined as a cylinder of circular cross-section. The sleeve 4 is made of a polymeric material that has been diametrically expanded and cross-linked by electron beam radiation. Subsequent to the cross-linking operation, circumferentially-spaced sleeve portions 6 and 8 have been welded together by radio-frequency welding equipment so as to produce the article having the figure-of-eight configuration shown. The manufactured article 2 has an upper cylindrical compartment 10 and a lower, larger cylindrical compartment 12 separated along the whole axial length of the sleeve 4 by a weld line 14. A hollow cylindrical insert 16 of solder is disposed within the smaller sleeve compartment 10, and may be retained therein, for example by partial local recovery of the sleeve 4 in that region.

Figure 2:
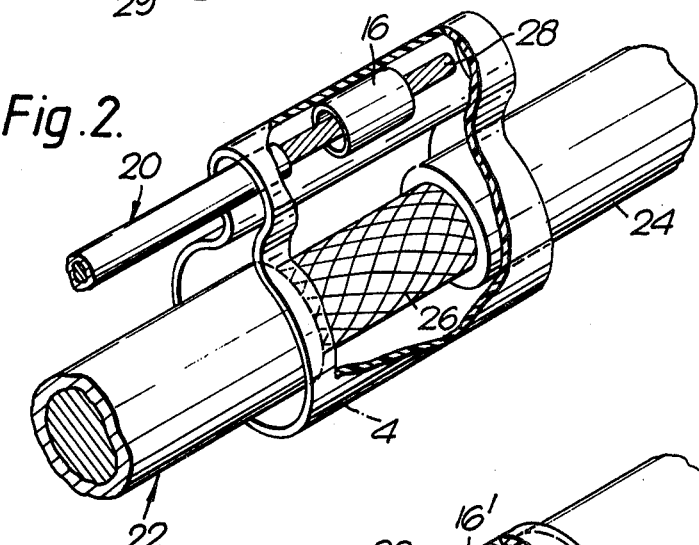
FIG. 2 is a perspective view of the article of FIG. 1 in a partially recovered state about a substrate.
Figure 3:
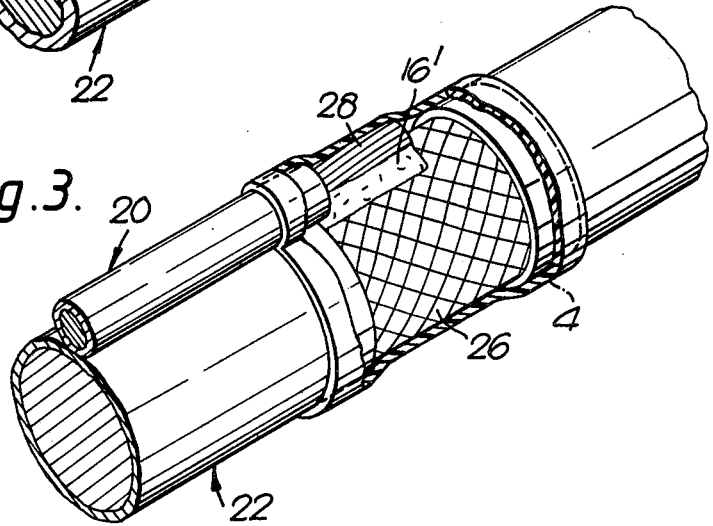
FIG. 3 is a view corresponding to FIG. 2 showing the article in its fully recovered state.

One application of the article 2, as shown in FIGS. 2 and 3, is to provide electrical and mechanical interconnection between and environmental sealing around, a wire 20 and a coaxial cable 22. The outer insulation 24 of the cable 22 is centre stripped to expose a portion 26 of the outer electrically-conductive braid, and the wire 20 is end stripped to expose a portion 28 of the conductor.

The electrical connector 2 is slid along the cable 22 so as to dispose the exposed braid 26 generally centrally of its sleeve compartment 12. The wire 20, which serves as a ground lead, is introduced into the sleeve compartment 10 so that the conductor 28 is surrounded by the solder insert 16. Heat is then applied to the sleeve 4 to raise its temperature above its crystalline melting point, thereby causing it to recover. In the manufacture of the article 2, the welding pressure and power used to produce the weld line 14 between the sleeve portions 6 and 8, the amount of radiation, and thus the degree of cross-linking, and the wall thickness of the sleeve, amongst other parameters, are all controlled such that upon heating the sleeve 4 to effect its recovery about a suitably-sized substrate, the forces produced within the sleeve material overcome the strength of the weld line 14, thereby causing the weld to fail and the two compartments 10 and 12 to merge into one. An intermediate stage, at which the weld line 14 has just failed is shown in FIG. 2. As heating continues, the sleeve 4 recovers more and more into conformity with the substrate, consisting of the combination of the wire 20 and cable 22, the solder 16 melts, and the conductor 28 is broght into contact with the cable braid 26 and electrically connected thereto by the fused solder 16 (FIG. 3). In the final stage of the article 2, as shown in FIG. 3, the sleeve 4 has fully recovered about the wire 20 and cable 22, and in addition to effecting electrical interconnection therebetween also provides mechanical retention and environmental sealing of the electrical connection. If desired, environmental sealing may be enhanced by providing one or both of the compartments 10, 12 of the sleeve 4 with fusible sealing material, for example as inserts of similar configurations to the solder insert 16. Conveniently, such sealing inserts may be provided at each end of the sleeve 4 as shown in outline at 29 in FIG. 1.

The weld line 14 is arranged to have sufficient strength such that under normal storage conditions, the article will remain substantially permanently in the configuration shown in FIG. 1.

Figure 4:
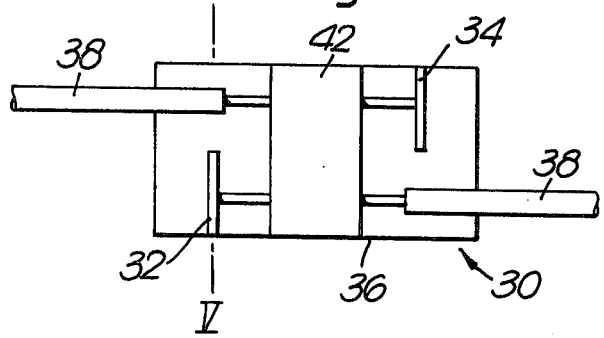
FIG. 4 is a side view of a second embodiment of the article, in its unrecovered state, located about two substrates.
Figure 5:
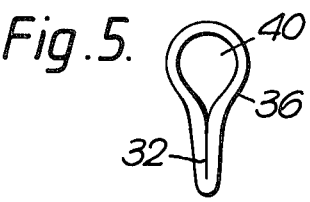
FIG. 5 is a section along the line v—v of FIG. 4.
Figure 6:
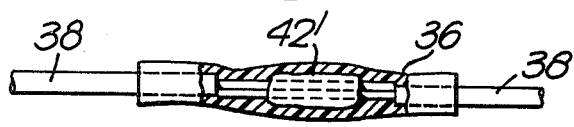
FIG. 6 is a view corresponding to that of FIG. 4.

Referring now to the embodiment of FIGS. 4 to 6, the article 30 is originally formed in the shape of a uniform cylindrical polymeric member in the same way as the sleeve 4 of the previous embodiment before welding. In the present embodiment, however, two weld lines 32 and 34 are made to produce a sleeve 36 that is arranged to receive two end stripped wires 38 into respective ends thereof.

The weld lines 32 and 34 extend approximately halfway across the diameter of the sleeve 36 and are located approximately symmetrically axially therewithin. Thus, the weld lines, in securing together circumferential portions of the sleeve 36 form respective apertures 40 (only one of which is shown in FIG. 5, with reference to the weld line 32) that provide for passages or compartments into which respective ones of the wires 38 are inserted. Furthermore, the weld lines terminate the compartments and act as end stops in respect of the wires 38 entering the sleeve 36 from opposing ends. Thus, the weld lines 32 and 34 facilitate positioning of the wires 38, which are to be electrically connected together, within the sleeve 36. A ring of solder 42 is located, and preferably secured, generally centrally of the sleeve 36, and thus encircles the stripped conductors of the wires 38.

The relative strength of the weld lines 32, 34 and the recovery forces produced within the sleeve 36 are arranged, as discussed above, such that on recovery of the sleeve 36 about the substrate 38 the weld lines fail and the sleeve 36 recovers into a generally tubular configuration around the wires 38. Furthermore, the heating required to effect such recovery causes the soldering 42 to melt and form a fused mass 42 around the wire conductors which are brought into overlapping configuration. The recovered state of the article around the wires 38 is shown in FIG. 6.

One or more fusible sealing inserts may be provided within the sleeve 36, for example, in respective ends thereof, to enhance the environmental sealing of the recovered sleeve 36 around the wires 38.

Figure 7:
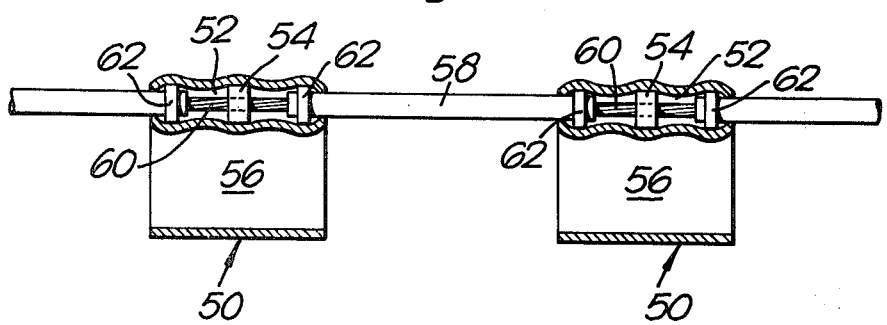
FIG. 7 is a sectional elevation of an assembly incorporating a plurality of the articles shown in FIG. 1.

Referring to FIG. 7, two electrical connectors 50 are substantially identical to the connector 2 of FIG. 1, each having an upper compartment (as oriented in the figure) 52 containing a solder ring 54 and a lower compartment 56. A single core insulated conductor 58 is centre-stripped in two places 60 and the conectors 50 are slid therealong such that the stripped portions 60 of the conductor 58 are disposed within the solder ring 54 of respective ones of the upper connector compartments 52. The length of the stripped portions 60 are selected having regard to the length of the compartment 52 such that rings 62 of fusible material disposed at each end of the compartments 52 encircle the conductor insulation when the stripped portions 60 are encircled by respective ones of the solder rings 54.

The compartments 52 are recovered to a slight extent such that the sealing rings 62 seal the conductor 58 to the connectors 50 without the temporary welds between the compartments 52 and 56 being destroyed. This pre-installation of the connectors 50 on the conductor 58 provides a daisy-chain arrangement, whereby other electrical components may be introduced into the connector compartments 56, the connectors heated to effect recovery and melting of the solder, destruction of the temporary welds, and connection of all such electrical components to the common potential of the conductor 58. It will be appreciated that the complete sealing of the stripped portions 60 of the conductor 58 avoids oxidation of the exposed conductor.

It is envisaged that more than two connectors in accordance with the present invention may be pre-installed on a conductor, terminal or other conductive member. It is also envisaged that an end-stripped conductor may be pre-installed in a connector.

Although the connectors of FIGS. 1 and 4 are formed with two compartments and apertures respectively, it will be appeciated that other members may be provided by appropriate positioning of temporary bonds, and may be arranged to merge into a single compartment or aperture or a smaller plurality of compartments or apertures.

It will be appreciated that articles in accordance with the present invention may conveniently be manufactured as contiguous articles in a long length that, if required, may subsequently be sub-divided. In this respect, reference is now made to FIG. 8. Two rectangular sheets 64, 66 of cross-linked polymeric material are arranged to overly one another. The sheets are permanently secured together at spaced-apart, aligned locations 68, and for convenience only five of these are shown. This securement may be achieved by welding the sheets together at these locations before they are cross-linked, or by any other suitable means. The sheet 66, which may or may not be recoverable, extends substantially in a plane between the locations 68, but the sheet 64, which is recoverable, is formed into a corrugated shape as indicated by the broken line 70, so as to form a plurality of spaced apart, generally semi-cylindrical enclosures 72 between successive locations 68.

Spaced apart portions of each enclosure 72 are temporarily secured together to form waist regions 74 so as to divide each enclosure into two compartments 76, 78. This securement may be achieved by welding the portions together after the sheet 64 has been cross-linked.

It will thus be appreciated that a contiguous plurality of recoverable articles have been provided, each of which is effectively the same as the article of FIG. 1. Accordingly, on recovery of the arrangement, for exaple by heat, the permanent welds at the locations 68 remain intact and the temporary welds at the waist regions 74 break.

Further features of the articles hereindescribed with reference to FIGS. 1 to 7 may be applied to the articles formed by the arrangement as exemplified by FIG. 8.

It is convenient for checking the quality of the connection effected by electrical connectors in accordance with the present invention to use a material for the article that is at least partially transparent, as shown above in FIGS. 1 to 6. However, it will be appreciated that this is not an essential feature of the article.

Other applications of articles in accordance with the invention are envisaged, for example the temporary securement provided by the invention may be so as to produce an article of a shape to facilitate its installation, and which, on subsequent recovery, may adopt another, desired configuration.

We claim:

1. A recoverable article in which spaced-apart portions thereof are temporarily secured together to form at least one compartment in the article, the article being recoverable by heat and being arranged such that forces produced therein on recovery about a substrate overcome forces securing said portions together.

2. An article according to claim 1, wherein at least said spaced-apart portions thereof are of cross-linked polymeric material.

3. An article according to claim 1 or 2, wherein said temporary securement between said portions thereof is effected by welding.

4. An article according to claim 3, wherein said welding operation is selected from a radio-frequency, high frequency, and ultrasonic welding.

5. An article according to claim 1, wherein at least said spaced-apart portions thereof are cross-linked, and wherein said temporary securement therebetween is subsequently effected by a welding operation.

6. An article according to claim 5, wherein said welding operation is selected from a radio-frequency, high frequency, and ultrasonic welding.

7. An article according to claim 1, having a generally tubular configuration.

8. An article according to claim 7, wherein the temporary securement of said portions is arranged to subdivide the article substantially axially thereof.

9. An article according to claim 7, wherein the temporary securement of said portions is arranged to subdivide the article substantially transversely thereof.

10. An article according to claim 7, comprising at least two generally tubular compartments, whose axes are substantially parallel.

11. An article according to claim 1, wherein at least one of said compartments contains fusible material.

12. An article according to claim 11, wherein said fusible material comprises solder.

13. An article according to claim 11 or 12, wherein said fusible material comprises environmental sealing material.

14. An article according to claim 1, comprising at least two compartments, wherein all the compartments are arranged to merge into a single compartment on said recovery of the article.

15. An article according to claim 1, wherein at least one of said compartments contains fusible material and wherein said fusible material is fusible at the temperature required to effect recovery of the article.

16. An arrangement comprising two sheets of material, at least one of which is recoverable by heat, overlying one another and permanently secured together at spaced-apart locations so as to define therebetween a plurality of recoverable articles, wherein spaced-apart portions of each of said articles are temporarily welded together to form at least one compartment in each article, each article being arranged such that forces produced therein on recovery about a substrate overcome forces securing said portions together.

17. An arrangement according to claim 16, wherein one of said sheets is substantially planar, and wherein said spaced-apart portions comprise portions of the other of said sheets.

18. An arrangement according to claim 17, wherein said planar sheet is substantially non-recoverable.

* * * * *